United States Patent [19]

Yoon et al.

[11] Patent Number: 5,062,915

[45] Date of Patent: Nov. 5, 1991

[54] LUMBER DOOR AND METHOD FOR MANUFACTURING THEREOF

[76] Inventors: Seok G. Yoon, 563-36, Sinlim 8-Dong, Kwanak-Ku, Seoul; Jeong Y. Seo, 804-5, Dooryoo 1-Dong, Dalseo-Ku, Daeku, Kyungsangbook-Do, both of Rep. of Korea

[21] Appl. No.: 406,898

[22] Filed: Sep. 11, 1989

Related U.S. Application Data

[62] Division of Ser. No. 257,860, Oct. 14, 1988, Pat. No. 4,908,990.

[30] Foreign Application Priority Data

Aug. 23, 1988 [KR] Rep. of Korea ............... 10726/1988

[51] Int. Cl.[5] ............................................ B29C 65/48

[52] U.S. Cl. .................................... 156/252; 144/346; 144/350; 144/352; 156/293; 156/304.5

[58] Field of Search ............... 156/154, 160, 252, 293, 156/295, 304.1, 304.5, 629; 49/501; 144/344, 346, 347, 348, 350, 351, 352, 353, 354, 242 K; 52/291, 391, 455, 457, 630, 782

[56] References Cited

U.S. PATENT DOCUMENTS

| | | | |
|---|---|---|---|
| 343,807 | 6/1886 | Field | 52/455 |
| 753,641 | 3/1904 | Shepherd | 156/293 |
| 1,452,913 | 4/1923 | Hughes | 52/782 |
| 1,909,510 | 5/1933 | Welch | 144/350 |
| 1,924,240 | 8/1933 | Harwell | 144/350 |
| 2,323,327 | 7/1943 | Hill et al. | 52/782 |
| 2,661,511 | 12/1953 | Weyerhaeuser | 52/782 |
| 2,663,662 | 12/1953 | Graf et al. | 156/293 |
| 3,305,992 | 2/1967 | Steed | 52/455 |
| 4,034,512 | 7/1977 | Lindal | 49/501 |
| 4,132,042 | 1/1979 | Di Maio | 49/501 |
| 4,547,255 | 10/1985 | Yow | 156/580 |

FOREIGN PATENT DOCUMENTS

| | | | |
|---|---|---|---|
| 0269252 | 11/1964 | Australia | 144/350 |
| 3225675 | 1/1984 | Fed. Rep. of Germany | 52/291 |
| 0096432 | 10/1922 | Switzerland | 49/501 |
| 0024102 | of 1906 | United Kingdom | 52/782 |
| 0390459 | 4/1933 | United Kingdom | 52/782 |

OTHER PUBLICATIONS

Boller, *Woodworking and Cabinetmaking*, 1986, pp. 178–182.

Spielman, *Gluing & Clamping: A Woodworker's Handbook*, 1986, pp. 55–57, 129–133.

Feirer, *Beginning Woodwork*, 1984, pp .177, 178.

Martensson, *The Woodworker's Bible*, 1979, p. 166.

"Solid Wood Doors", *Fine Woodworking*, Jul., Aug. 1979, No. 17, pp. 78, 79.

*Primary Examiner*—Michael W. Ball

*Assistant Examiner*—Steven D. Maki

*Attorney, Agent, or Firm*—Stanger, Michaelson, Spivak & Wallace

[57] ABSTRACT

A lumber door and manufacturing method thereof which is constructed by perforating the plurality of the pipe inserting holes at each of the unit lumbers in the direction of transverse and thickness with the predetermined diameter, depth and location, inserting the plurality of the metal pipes into the pipe inserting holes, and assembling the unit lumbers and the pipes one by one with spreading over the adhesive resin to both of the surfaces of the pipes and to the contacting surfaces so as to be adhered each other to form a single integrally formed lumber door, and pressing at once the plurality of the lumber door assembly piled up one above one within a press machine for about two hours, and forming the engraving patterns on the surface of the lumber door within the region where pipes are not arranged, so that a single integrally formed lumber door can be prevented or excluded from the bending, twisting and cracking phenomena due to the changes of the temperature and the humidity of the environment, thereby the productivity, the cost and the appearance are improved and the duration will be extended for long period.

15 Claims, 4 Drawing Sheets

FIG, 5
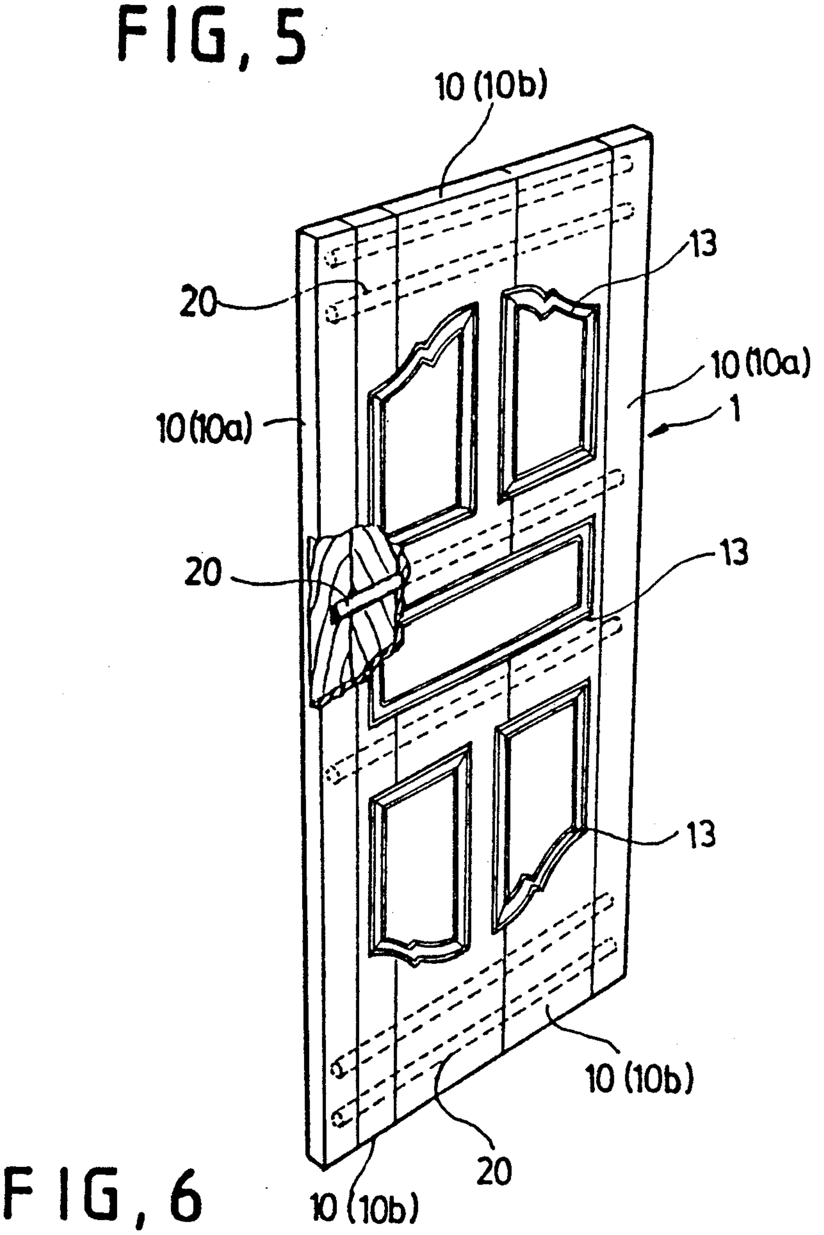
FIG, 6
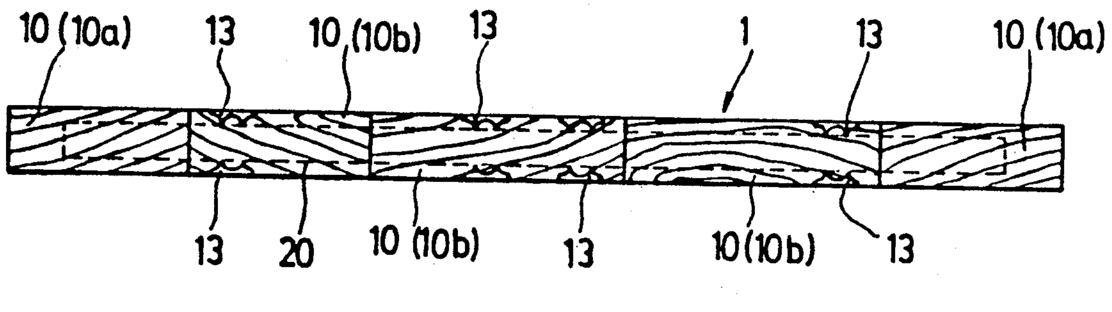

FIG, 7A
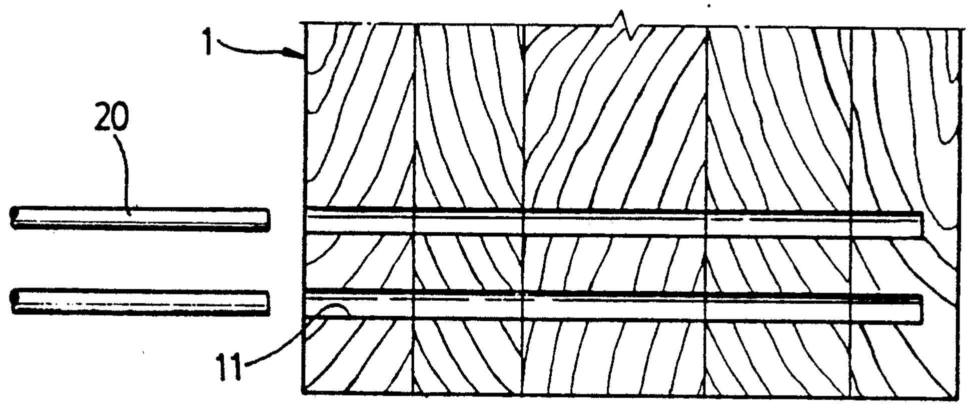
FIG, 7B
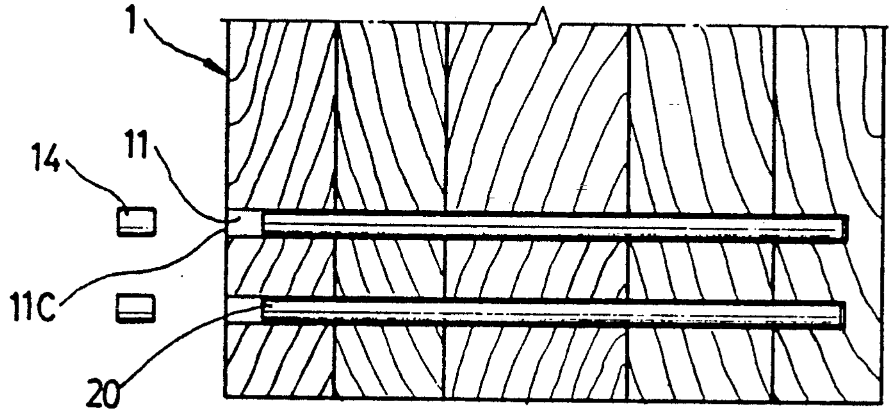

LUMBER DOOR AND METHOD FOR MANUFACTURING THEREOF

This is a division of application Ser. No. 257,860 filed Oct. 14, 1988 now U.S. Pat. No. 4,908,990.

BACKGROUND OF THE INVENTION

The present invention relates to a lumber door for entrance and exit and the method for manufacturing thereof which is constructed with several unit lumbers having rectangular sections by bonding them successively, more specifically, relates to a lumber door and the method for manufacturing thereof which, by assembling a lumber door of single plate form with coupling each piece of the lumber to be bonded together via metal pipes such as cast iron pipes or steel pipes and by engraving desired patterns at both the inner and outer surfaces of said door, allows to exclude the phenomena of the bending and the twisting of the door in accordance with the constricting deformation of the lumber as well as reinforcing further the bonding strength of the lumber door assembled with the plurality of each unit lumber.

Heretofore, there has been also known a lumber door which is formed as a single plate form door for entrance and exit by bonding the plurality of lumbers having the predetermined thickness.

However, since the conventional lumber door is the one that the concave and the convex portions are formed which are to be coupled each other at both of the contacting surfaces of each unit lumber and whereby a single plate form lumber door is constructed with method of simply coupling by inserting each concave and convex portion of these unit lumbers and then abhering them together, there has been the necessity of troublesome and complicated producing process which have to be formed respectively the concave and convex portions opposite to each other at the contacting surfaces of each unit lumber, so that not only the productivity becomes of course extremely decreased and the loss of the lumber materials becomes rather much and the occurrence rate of the inferior products becomes higher, but also there has been the problems which the entire of a lumber door is bent or twisted because, with a lumber door produced such as these, the basic grain formed in the longitudinal direction of the lumber according to the differences of the temperature and humidity of the inside and outside is readily constricted and deformed.

SUMMARY OF THE INVENTION

Therefore, the primary object of the present invention is to provide a lumber door and the manufacturing method of said lumber door which is eliminated with various disadvantages and problems such as aforementioned.

The further object of the present invention is to provide a lumber door and the manufacturing method of said lumber door which is capable of excluding almost completely the bending and twisting of each unit lumber material or the entire of a lumber door against the contracting deformation factor operable to the assembled lumber door, and making the bonding force between the unit lumbers each other to be contacted so as to be raised with significantly higher.

Another object of the present invention is to provide a lumber door and the manufacturing method of said lumber door which is capable of enhancing significantly the productivity by adhering with pressure at once a number of sets of the lumber doors utilizing a high pressure press machine.

Still another object of the present invention is to provide a lumber door and the manufacturing method of said lumber door which the surface treatment of the adhering portion is excellent by increasing significantly the bonding force of especially the surface portion of inside and outside among the containing surfaces of the unit lumber material to be contacted and adhered each other.

The other object of the present invention is also to provide a lumber door and the manufacturing method of said lumber door which is possible to raise up the utilization of the raw materials and to reduce the necessary raw materials by excluding the loss of the lumber materials according to the cutting off of the concave and convex portions which may be coupled each other at the contacting surface portions of each unit lumber material.

In order to attain the above mentioned objects, a lumber door according to the present invention is constructed with combination of the plurality of the unit lumber materials in which the plurality of the pipe inserting holes communicating each other are disposed transversely at upper and lower portions as well as the middle portion of the contacting surface of each lumber material having the slightly inwardly curved cut out portion, and the plurality of the metal pipes made of steel pipe such as cast iron pipe or stainless steel pipe which may be inserted through these transverse directional inserting holes of each unit lumber. Each unit lumber is, owing to the contacting surfaces of each unit lumber are adhered with the pressure by the high pressure press machine under the condition that the adhesive resin is spread out on the slightly inwardly curved cut out portion of said contacting surface and over the metal pipes described above to be inserted through the inserting holes of each unit lumber, by which the slightly inwardly curved cut out portion formed on each contacting surface becomes to be adhered with pressure so as to have the linear surface, allowed to construct a single plate formed lumber door having the predetermined dimension, and at both of inside and outside surfaces of the lumber door assembled such as described above, the engraving patterns having the predetermined width and depth may be formed on the region in the transverse and longitudinal direction of each unit lumber except the pipe passing through portion of above mentioned.

In the lumber door according to the present invention, since each unit lumber, which said slightly inwadly curved cut out portion of the contacting surface is deformed and adhered by the pressure of the high pressure press machine, is bonded tightly by the plurality of the metal pipes, and because the engraving patterns are formed that cuts partly the basic grain which the unit lumber include, that is, the lumber grain being contractively deformed depending upon the changes of the temperature and the humidity of the environment at both surfaces of inside and outside of the lumber door adhered together, so that the adhering strength of the lumber door assembled with adhering the plurality of the unit lumbers can be reinforced extraordinarily and also the surface treatment of inside and outside of each contacting portion becomes excellent, therefore the bending, twisting and cracking of the lumber door due to the contractive deformation of the basic grain which the unit lumber include are prevented, thereby the utilizing duration of a lumber door can be extended for a long while.

Specifically, according to the present invention, the productivity can be raised further because the plurality of the lumber doors can be manufactured at once with bonding by one time pressing operation of the press machine, and also the utilizing rate of the raw materials can be raised further by minimizing the loss of the lumber because the tight adhering between the unit lumbers can be obtained without forming the concave and convex portions for coupling as conventional art by cutting off the contacting surface of each unit lumber.

Aforementioned and other objects, features and advantages according to the present invention will become more apparent from the following detailed description taken in conjunction with the accompanying drawings.

BRIEF DESCRIPTION OF THE DRAWINGS

FIG. 5 is a perspective view partly cut out in the state that the engraving pattern is formed on the lumber door according to an embodiment of the present invention.

FIG. 6 is a cross sectional view of FIG. 5.

FIGS. 7A and 7B are schematic diagram showing the constructing process of a lumber door according to another embodiment of the present invention; in which, FIG. 7A is a longitudinal sectional view of the condition that pipe inserting holes are formed at a lumber door pressed and bonded.

FIG. 7B is a longitudinal sectional view of the condition that pipes are inserted within the inserting holes of above.

DETAILED DESCRIPTION OF THE INVENTION

Figure 1:
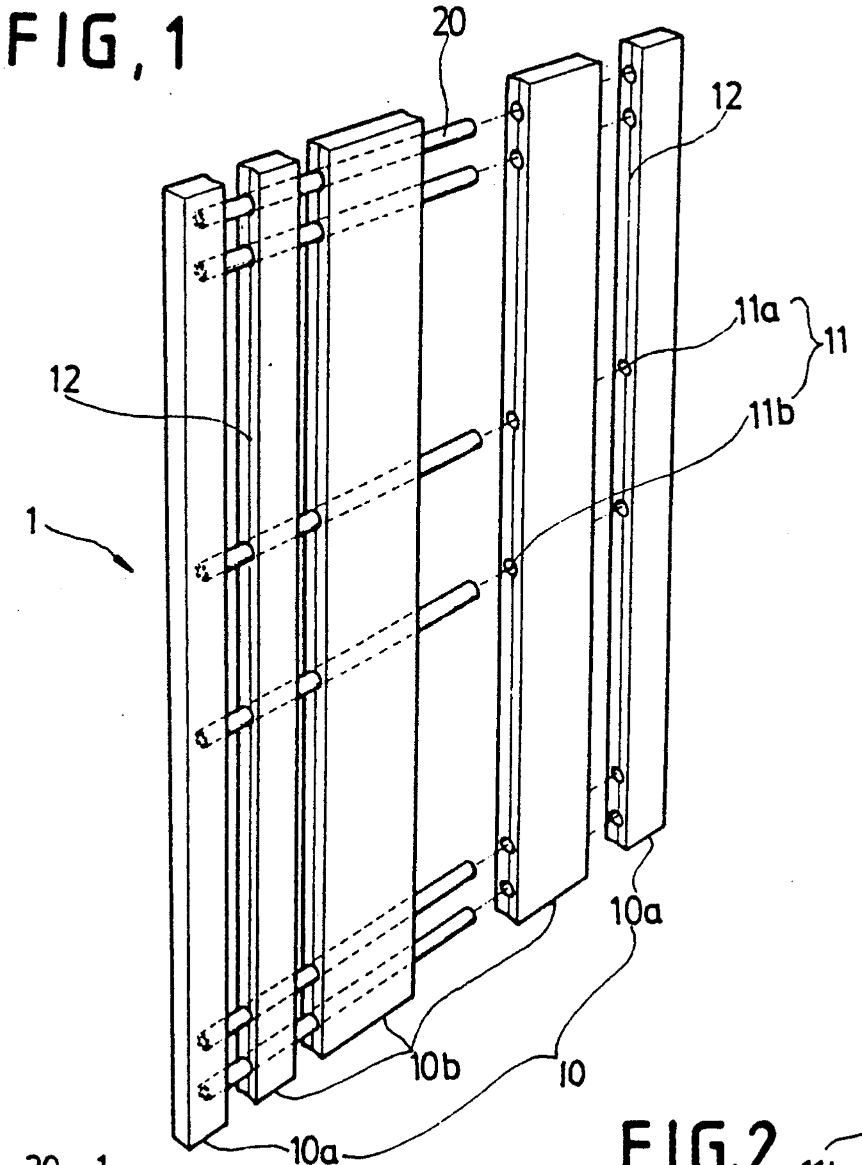
FIG. 1 is an exploded perspective view showing the structure of a lumber door according to an embodiment of the present invention.
Figure 2:
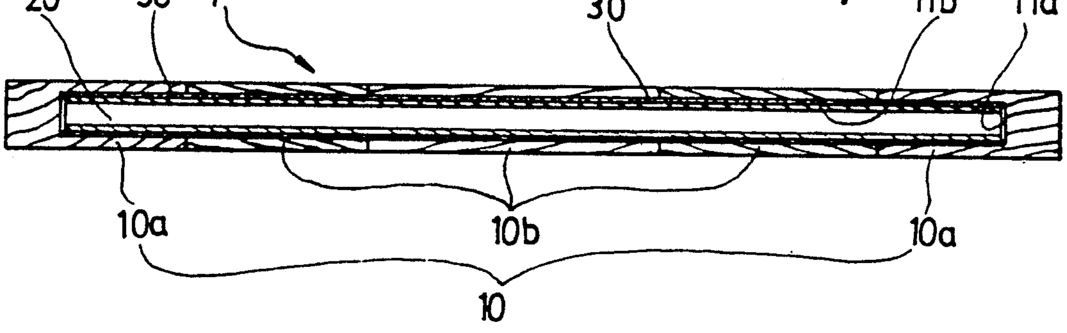
FIG. 2 is a cross sectional view in the state that unit lumbers of the lumber door according to an embodiment of the present invention are bonded each other.

FIG. 1 shows the structure of a lumber door according to an embodiment of the present invention, and FIG. 2 shows the bonding condition of the lumber door, and FIG. 5 and FIG. 6 illustrate, respectively, the lumber door constructed according to an embodement of the present invention, as shown in these figures, a lumber door 1 according to the present invention is constructed with the plurality of elongated rectangularly shaped unit lumbers 10 in which a number of inserting holes 11 are perforated so as to communicate each other along with the transverse direction of said lumber body and with the plurality of metal pipes 20 which are inserted tightly through said inserting holes 11 of each unit lumber 10.

Among the inserting holes 11 formed with each unit lumber 10 as above, respective inserting holes **11*a* of the exterior unit lumbers 10*a* disposed at both ends of right and left are perforated at both of upper and lower portions as well as the middle portion of a side surface of the exterior lumbers 10*a* having a predetermined width so as to have a predetermined depth to have said metal pipes 20 to be inserted tightly therein, whereas respective inserting holes 11*b* of each interior unit lumber 10*b* disposed between the exterior unit lumbers 10*a* are perforated at both of upper and lower portions as well as the middle portion so as to pass through and to communicate with each other over every interior lumbers 10*b*** all together.

Figure 3:
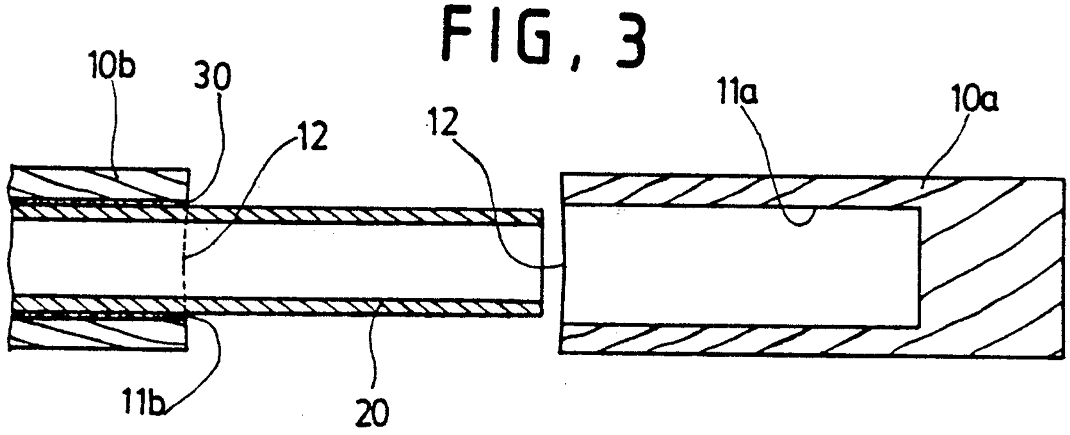
FIG. 3 is a partial cross sectional view showing the slightly inwardly curved cut out portion formed at each contacting surface in the condition that the unit lumber according to the present invention is not yet bonded.

Further, at a side surface or both surfaces of the contacting surface portion on which each of the unit lumbers 10 having the inserting holes 11 are adhered each other as shown in FIG. 3, slightly inwardly curved cut out portions 12 which have slightly inwardly curved surface to be formed in deep gradually as it goes to a middle portion is formed opposite to each other, so that the bonding force between the lumbers 10 is made to be able to raise further because both of the slightly inwardly curved cut out portions 12 may be bonded with deforming into linear surface state by pressure according to each lumber 10 which is to be pressed under the condition that the adhesive resin 30 is spread over to these respective cut out portions 12.

The metal pipes 20 which are inserted through the inserting holes 11 of each of said unit lumbers 10 employ steel pipes such as cast iron or stainless steel pipe which have the strength capable of confronting sufficiently against the contractive deformation stress of the assembled lumber door 11, and the bonding force of the assembled lumber door 1 is made to be able to maintain tightly with the condition that the adhesive resin 30 is spread over between these respective pipes 20 and the inserting holes 11. Specifically, at this time, when the pipes 20 are applied with steel pipe and the aqueous adhesive resin is applied for the adhesive resin 30 as shown herein, the bonding force can be increased extraordinarily because each pipe 20 and the lumbers 10 are integrally formed due to the surface corrosion of the steel pipes 20.

Furthermore, the engraved pattern grooves 13 having the predetermined width and depth are formed on the interior region of the middle portion and the upper and lower portions of both inside and outside surfaces of the assembled lumber door 1, the beautiful appearance of a lumber door 1 may be allowed to look better as well as the basic grain which is extended longitudinally along each unit lumber 10 is made to cut off partially.

The manufacturing process of the lumber door of the present invention constructed as described hereinbefore will be explained as followings.

At first, in case of manufacturing a lumber door 1 according to an embodiment of the present invention constructed as above, desired number of the pipe inserting holes 11 are perforated to each unit lumber 10 having the predetermined thickness and length, and the slightly inwardly curved cut out portion 12 is formed at each contacting surface, after the adhesive resin 30 is spread over to both of the slightly inwardly curved cut out portions 12 and the inserting holes 11, then each lumbers 10 and the pipes 20 are assembled and bonded by inserting successively the pipes 20 through the inserting holes 11, as shown in FIG. 1.

At this moment, the slightly inwardly curved cut out portion 12 is the one for increasing the bonding force between the unit lumbers 10, for example, in case that the unit lumber 10 of 36 mm thickness is utilized for the slightly inwardly curved cut out portion 12, about 0.5 mm of the maximum depth for the middle portion is preferable, further, the adhesive resin 30 to be spread thereof makes no difference if it would be spread as much as an half width of the thickness of each unit lumber 10 with centering the middle portion of the slightly inwardly curved cut out portion 12.

Figure 4:
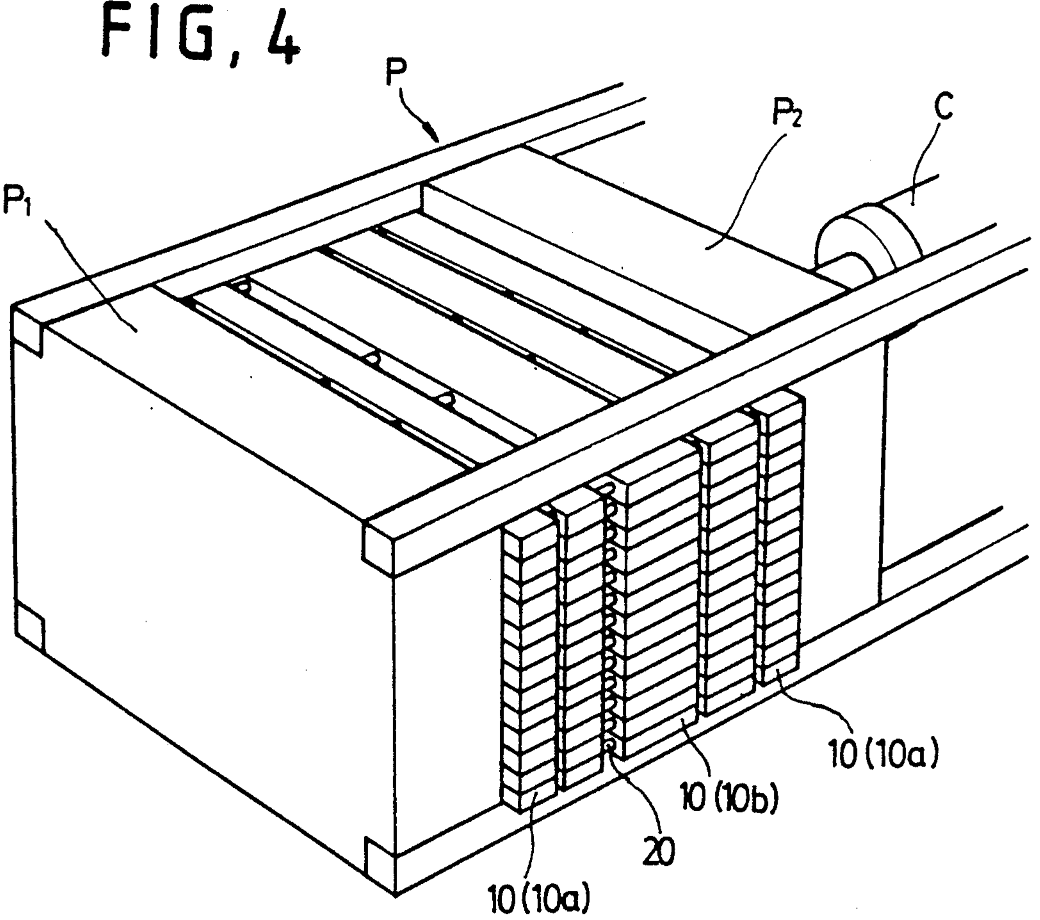
FIG. 4 is a perspective view showing the process which the unit lumbers of the lumber door according to an embodiment of the present invention are being pressed and bonded by the press machine.

Thus, when the primary coupling of the unit lumbers 10 and the pipes 10 are completed, as shown in FIG. 4, the plural sets of the lumber door assembly are piled up successively one above one between the fixed plate Pl and the movable plate P2 of the high pressure press machine P, if the movable plate P2 are moved forwardly by actuating the cylinder C of the press machine P, since each unit lumber 10 is powerfully pressed and bonded by the high pressure (100 kg/cm$^2$) according to the movable plate P2, the close adhering of the unit lumbers 10 and the pipes 20 can be obtained, at the same time, each of the slightly inwardly curved cut out portions 12 which are formed opposite to the contacting surface of the lumbers 10 may be pressed, deformed and adhered into the linear surface, and by the pressing force at this moment, the adhering resin 30 which is spread at the middle portion of the slightly inwardly curved cut out portions 12 is forced out and then the adhesive resin 30 becomes spread evenly over the whole contacting surface, thereby the close contact adhering between the contacting surfaces can be obtained, specifically the pressed bonding force of both end portions of each contacting surface, that is to say, the location of the inside and outside surface portions of the unit lumber 10 to be adhered each other can be increased extraordinarily, so that the surface treatment of the bonded lumber door 1 is completely accomplished.

When the coupling between the unit lumbers 10 and the pipes 20 are completed with having been elapsed the period of time about two hours within the pressed condition as described above, the assembled each lumber door 1 is removed from the press machine P, utilizing the conventional engraving apparatus, by forming the engraving pattern 13 having the predetermined shape at the region where the pipes 20 are not inserted among the inside and outside surfaces of said lumber door 1, thereby the manufacturing of a lumber door 1 is completed.

Since the lumber door manufactured with the method as aforementioned is constructed such that the plural pieces of the unit lumbers 10 are connected with the plurality of the metal pipes 20, and the slightly inwardly curved cut out portions 12 which are formed at each contacting surface are pressed and adhered into the linear surface by the pressure according to the press machine P, and also the engraving patterns 13 which cut off the basic grain of each lumber 10 are formed on both the inside and outside surfaces of the bonded unit lumbers 10, therefore, the simultaneous manufacturing of the plurality of the lumber doors by the high pressure press machine P has become possible, and the coupling and bonding force between the unit lumbers 10 combined each other can be increased and reinforced, specifically the pressed bonding force of the surface portion of the lumber door 1 has become possible to raise up extraordinarily, so that not only the surface treatment of the product is excellent, but also the bending, twisting and cracking due to the differences or the changes of the temperature and the humidity effecting on the inside and outside of the lumber door 1 can be prevented completely.

Though the method is illustrated and explained as an example which, in above embodiment, in case of manufacturing the lumber door according to the present invention, firstly each two's pipe inserting holes 11 are perforated at upper and lower portions and the middle portion of each unit lumbers 10, after the metal pipes 20 are inserted into these inserting holes 11, then pressing them with the press machine P, the fixing location and the number of said pipes 20 can be varied or increased and decreased according to the dimension of the lumber door 1 and the location of the engraving patterns 13 to be formed on the inside and outside of the lumber door 1, alternatively, in praticing the present invention, as aforementioned instead of forming previously the pipe inserting holes 11 at each unit lumber 10, after the unit lumbers 10 are pressed and adhered, as shown in FIGS. 7A and 7B, after perforating at once the inserting holes 11 of the predetermined depth to the unit lumbers 10 adhered each other, that is, from a side of the lumber door 1 assembled, inserting the pipes 20 which the adhering resin is spread over, and by closing and inserting with the separate wooden bar 14 to the opening end 11C of the inserting holes 11 exposed at a side, thereby the lumber door 1 can be assembled into a plate, and also the operation and effect of a lumber door manufactured with the method as above is similar as described hereinbefore.

As described above, since the present invention such as explained as above, in constructing and manufacturing the lumber door of the single integral form by coupling and bonding the plural pieces of the unit lumber one by one successively, the plurality of the pipe inserting holes which may be communicated each other are formed at the predetermined position of the unit lumber to be adhered each other, and the metal pipes are inserted into these inserting holes, under this condition, single integrally formed lumber door is assembled by pressing each of the unit lumbers with the high pressure press machine, and then the engraving patterns which cut off partially the basic grain of each unit lumber on the inside and outside surfaces of the lumber door are engraved, thus a lumber door is manufactured finally, therefore, the present invention has the effectiveness such that the mass production of the lumber door may become possible and the productivity may be elevated extraordinarily and the rate of utilizing the raw materials may be raised higher, the coupling and adhering condition of the manufactured lumber door can be maintained tightly, and also the utilizing duration of a lumber door can be extended for long period by excluding completely the varying factors such as the bending, twisting and cracking phenomena according to the changes of the temperature and the humidity of the outside environment.

What is claimed is:

1. A method of manufacturing a door having two sides, comprising:
   - forming a number of openings in each of a plurality of lumber pieces;
   - aligning the pieces such that the openings of one piece align with the openings in another piece;
   - passing metal pipes through respective aligned openings in the plurality of pieces;
   - applying an adhesive so that said adhesive passes between said pipes and said pieces when the pipes pass through said openings;

pressing the pieces together and allowing said adhesive to cure so as to secure said pipes and said pieces to each other;

the step of passing the metal pipes through the opening including passing them so that they extend substantially from one side of the door to the other; and the step of applying the adhesive includes applying an adhesive having means for corroding said pipes so that said pipes grip the pieces.

2. A method as in claim 1, further comprising:

forming said pieces so that each of said pieces includes two surfaces and an edge extending along a longitudinally elongated direction between the surfaces, each of the edges being substantially concave about an axis parallel to the longitudinally elongated direction;

the step of applying an adhesive including applying adhesive to a number of the edges;

each of the edges defining a center portion between the surfaces;

placing the edges edge to edge and compressing the pieces edge to edge so that each piece is compressed more near the surfaces than the center portion.

3. A method as in claim 2, further comprising engraving patterns on the surfaces of the pieces away from the pipes.

4. A method of manufacturing a door having two sides, comprising:

forming a number of openings in each of a plurality of lumber pieces;

aligning the pieces such that the openings of one piece align with the openings in another piece;

passing metal pipes through respective aligned openings in the plurality of pieces;

applying an adhesive so that said adhesive passes between said pipes and said pieces when the pipes pass through said openings;

pressing the pieces together and allowing said adhesive to cure so as to secure said pipes and said pieces to each other;

the step of passing the metal pipes through the opening including passing them so that they extend substantially from one side of the door to the other; and forming said pieces so that each of said pieces includes two surfaces and an edge extending along a longitudinally elongated direction between the surfaces and each of the plurality of edges being substantially concave along an axis parallel to the longitudinally elongated direction;

the step of applying an adhesive including applying adhesive to a number of the edges;

each of said pieces defining a center portion between the surfaces;

placing the edges edge to edge and compressing the pieces edge to edge so that each piece is compressed more near the surfaces than the center portion.

5. A method as in claim 4, further comprising engraving patterns on the surfaces of the pieces away from the pipes.

6. A method of manufacturing a door having two sides, comprising:

forming a number of openings in each of a plurality of lumber pieces;

aligning the pieces such that the openings of one piece align with the openings in another piece;

passing metal pipes through respective aligned openings in the plurality of pieces;

applying an adhesive so that said adhesive passes between said pipes and said pieces when the pipes pass through said openings;

pressing the pieces together and allowing said adhesive to cure so as to secure said pipes and said pieces to each other;

the step of passing the metal pipes through the opening including passing them so that they extend substantially from one side of the door to the other; and said pieces each including two surfaces and a longitudinal edge extending between the surfaces;

placing a plurality of the edges adjacent to each other;

the step of applying an adhesive includes applying an adhesive to a number of said edges, each of said edges being concave along an axis parallel to the longitudinal edge;

compressing said concave edges against an adjacent concave edge 1.

7. A method as in claim 6, further comprising engraving patterns on the surfaces of the pieces away from said pipes.

8. A method of manufacturing a door, comprising:

placing a plurality of elongated lumber pieces side by side;

passing a plurality of metal pipes through openings in said pieces transverse to the length of said pieces;

said pieces each including two surfaces and an edge extending in a longitudinally elongated direction between the surfaces, each of the edges being concave about an axis parallel to the longitudinal direction, a plurality of edges being adjacent to each other;

bonding a plurality of the concave edges to an adjacent concave edge.

9. A method as in claim 8, wherein each of the plurality of edges has an elongated center portion extending along the elongated direction and compressing said pieces edge to edge more near the surfaces than the center portion.

10. A method as in claim 8, wherein the step of bonding includes applying an adhesive material between the pieces and said pipes for securing the pieces to said pipes.

11. A method as in claim 10, wherein said step of bonding includes using an adhesive material for corroding said pipes so said pipes grip the pieces.

12. A method as in claim 9 further comprising engraving patterns on the surfaces of the pieces away from the pipes.

13. A method as in claim 12, wherein the step of bonding includes applying an adhesive material between the pieces and said pipes for securing the pieces to said pipes.

14. A method as in claim 13, wherein said step of bonding includes using an adhesive material for corroding said pipes so said pipes grip the pieces.

15. A method as in claim 11, further comprising engraving patterns on the surfaces of said pieces away from said pipes.

* * * * *